United States Patent Office 3,245,783
Patented Apr. 12, 1966

3,245,783
MATERIAL FOR ELECTROPHOTOGRAPHIC
PURPOSES
Wilhelm Neugebauer, Martha Tomanek, and Hans Behmenburg, all of Wiesbaden-Biebrich, Germany, assignors, by mesne assignments, to Azoplate Corporation, Murray Hill, N.J.
No Drawing. Filed Apr. 8, 1960, Ser. No. 20,838
Claims priority, application Germany, Apr. 9, 1959, K 37,437
9 Claims. (Cl. 96—1)

Electrophotographic material normally consists of a support on which there is a photoconductive substance, this coating being provided with an electrostatic charge in the absence of light. The material is then exposed to light behind a master, or an eposcopic image is projected thereon, so that an electrostatic image is formed which corresponds to the master. This image is developed by being briefly contacted with a resin powder, whereupon a visible image is formed which is fixed by heating or by the action of solvents. In this way, an image of the master which is resistant to abrasion is obtained electrophotographically.

For the photoconductive coatings, inorganic substances such as selenium, sulphur or zinc oxide have been used and organic compounds such as anthracene and anthraquinone have also been employed for this purpose.

In accordance with the present invention, a material for electrophotographic purposes is provided in which the photoconductive coating comprises one or more organic compounds having at least three carbocyclic fused rings, at least two of which are fused benzene rings which may be substituted by oxygen and at least one of which carries at least one amino group.

The supports for the photoconductive coatings are primarily foils made of metal, e.g., aluminum, zinc, copper; cellulose products such as paper and cellulose hydrate; cellulose esters such as cellulose acetate and cellulose butyrate; especially such esters which are partially saponified and plastics having a specific conductivity higher than $10^{-12}$ ohm$^{-1}$.cm.$^{-1}$, such as polyvinyl alcohol, polyamides and polyurethanes.

A support useful for the preparation of the material of the present invention should be electroconductive. This term means in the present case that the support should have an electroconductivity which is suitable for electrophotographic purposes. Such supports comprise very good conductors, e.g., metal, as well as materials which have a relatively low conductivity and are not conductors in the usual sense, such as paper. The term "electroconductive support" in the meaning of the present case comprises supports which have a specific conductivity higher than $10^{-12}$ ohm$^{-1}$.cm.$^{-1}$, preferably higher than $10^{-10}$ ohm$^{-1}$.cm.$^{-1}$.

If paper is used as supporting material, it is preferably pretreated against the penetration of the coating solutions, e.g., it can be treated with a solution of methyl cellulose or polyvinyl alcohol in water or with a solution of an interpolymer of acrylic acid methyl ester and acrylonitrile in a mixture of acetone and methylethylketone, or with solutions of polyamides in aqueous alcohols or with aqueous dispersions of such substances.

Exemplary of the organic compounds used in the photoconductive coatings of the invention are 2-aminoanthracene, 1-amino-anthracene, 1-amino-pyrene and 13-amino-benzanthrone, 5-amino-acenaphthene, which have the following formulae respectively:

Formula 1

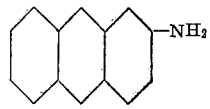

Formula 2

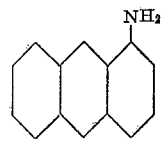

Formula 3

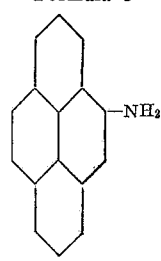

Formula 4

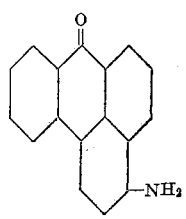

Formula 5

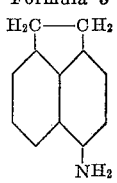

The preparation of the compounds is by the usual processes of organic chemistry, such as reduction of the corresponding nitro or nitroso compound or conversion of the corresponding halogen compounds into the amino compounds by means of ammonia or amino compounds or amines under conditions of heat and possible increased pressure.

The compounds are very well suited for the production of photoconductive coatings and are generally colorless.

For the preparation of the electrophotographic material, the photoconductive amino compounds containing more than two carbocyclic fused rings are preferably dissolved in organic solvents such as benzene, acetone, methylene chloride or ethylene glycol monomethylether or other organic solvents in which they are readily soluble, or in mixture of such solvents. These solutions are coated upon the supporting material in the normal manner, e.g., by immersion processes, painting or roller application or by spraying. The material is then heated so that the solvent is removed.

A number of the compounds in question can be applied together to the supporting material or the compounds can be applied in association with other photoconductive substances.

Further, it is often advantageous for the compounds to be used in association with organic resins as photoconductive coatings. Resins primarily of interest for this purpose include natural resins such as balsam resins, colophony and shellac, synthetic resins such as phenol resins modified with colophony, and other resins in which colophony constitutes the major part, coumarone resins, indene resins and those included under the collective term "synthetic lacquer resins." According to the Saechtling-Zebrowski Plastics Handbook, 11th edition, 1955, page 212 et seq., these include the following: processed natural substances such as cellulose ethers; polymers such as vinyl polymers, e.g., polyvinyl chloride, polyvinylidene chloride, polyvinyl acetate, polyvinyl acetals, polyvinyl ethers, polyacrylic and polymethacrylic acid esters, as also polystyrene and isobutylene and chlorinated rubber; polycondensates, e.g., polyesters, such as phthalate resin, alkyd resin, maleic resinate, maleic acid/colophony mixed esters of higher alcohols, phenol-formaldehyde resins, in particular phenol-formaldehyde resins modified with colophony, urea-formaldehyde condensates, melamine-formaldehyde resins, aldehyde resins, ketone resins, particularly so-called AW 2 resins, xylene-formaldehyde resins, polyamides and polyadducts such as polyurethanes. Also, polyolefins such as various polyethylenes and polypropylenes and phthalic acid polyesters, such as terephthalic and isophthalic acid ethylene glycol polyesters may be used.

If the photoconductive compounds are used in association with the resins described above, the proportion of resin to photoconductive substance can vary very greatly. Mixtures of from 2 parts of resin and one part of photoconductive substance to two parts of photoconductive substance to one part of resin are preferred. Mixtures of the two substances in equal parts by weight are particularly favorable.

The solutions of the compounds, with or without the resins, are applied to the supports in the usual manner, for example, by painting, roller application, immersion processes or by spraying, and then dried. An even, homogeneous, transparent and, in most cases, colorless photoconductive layer is thus formed.

The light-sensitivity of these photoconductive coatings is in the long wave ultra-violet region, at about 3600–4200 A. With high-pressure mercury vapor lamps, which transmit a large amount of ultra-violet rays, short exposure times can, however, be achieved.

The light-sensitivity of the photoconductive layer in the visible part of the spectrum, can be highly improved by the addition of sensitizers so that even with ordinary light sources short exposure times can be achieved. Even very small additions, e.g., less than 0.01 percent, have considerable effect. In general, however, the amount of "sensitizer" to be added to the photoconductive substance is from 0.01 to 5 percent, and preferably 0.1 to 3 percent. The addition of larger quantities is possible but in general is not accompanied by any considerable increase in sensitivity.

Suitable sensitizers are constituted in particular by dyestuffs, of which some examples are listed below. They are taken from Schultz' "Farbstofftabellen" (7th edition, 1931, 1st vol.):

Triarylmethane dyestuffs such as Brilliant Green (No. 760, p. 314), Victoria Blue B (No. 822, p. 347), Methyl Violet (No. 783, p. 327), Crystal Violet (No. 785, p. 329), Acid Violet 6 B (No. 831, p. 351); xanthene dyestuffs, namely rhodamines, such as Rhodamine B (No. 864, p. 365), Rhodamine 6 G (No. 866, p. 366), Rhodamine G Extra (No. 865, p. 366), sulphorhodamine B (No. 863, p. 364) and Fast Acid Eosin G (No. 870, p. 368) as also phthaleins such as Eosin S (No. 883, p. 375), Eosin A (No. 881, p. 374), Erythrosin (No. 886, p. 376), Phloxin (No. 890, p. 378), Bengal Rose (No. 889, p. 378), and Fluorescein (No. 880, p. 373); thiazine dyestuffs such as Methylene Blue (No. 1038, p. 449); acridine dyestuffs such as Acridine Yellow (No. 901, p. 383), Acridine Orange (No. 908, p. 387) and Trypaflavine (No. 906, p. 386); quinoline dyestuffs such as Pinacyanol (No. 924, p. 396) and Cryptocyanine (No. 927, p. 397); quinone dyestuffs and ketone dyestuffs such as Alizarin (No. 1141, p. 499), Alizarin Red S (No. 1145, p. 502), and Quinizarine (No. 1148, p. 504); cyanine dyestuffs, e.g. Cyanine (No. 921, p. 394) and chlorophyll.

For the production of copies using the electrocopying material, the photoconductive coating is charged positively or negatively, by means of, for example, a corona discharge with a charging apparatus maintained at 6000–7000 volts. The electro-copying material is then exposed to light in contact with a master or, alternatively, an episcopic or diascopic image is projected thereon. An electrostatic image corresponding to the master is thus produced on the material. This invisible image is developed by contact with a developer powder consisting of carrier and toner. The carrier used may be, for example, tiny glass balls, iron powder or tiny plastic balls. The toner consists of a resin-carbon black mixture or a pigmented resin of a grain size of 1 to 100μ. The developer may also consist of a resin or pigment suspended in a non-conductive liquid in which resins may be dissolved. The image that now becomes visible is then fixed, e.g., by heating with an infra-red radiator to 100–170° C., preferably 120–150° C. or by treatment with solvents such as trichloroethylene, carbon tetrachloride or ethyl alcohol, or steam. If a polarity of the electrical charge is used which is opposite to the polarity of the toner contained in the developer, images corresponding to the master, characterized by good contrast effect, are obtained. By changing the polarity of the corona discharge it is also possible to obtain reversal images by using the same master and the same developer.

After being fixed, these electrophotographic images can to converted into printing plates, if the support, e.g., paper, metal or plastic foil, is wiped over with a solvent for the photoconductive layer, e.g., alcohol or acetic acid, then washed down with water and inked up in known manner with greasy ink.

In this way, printing plates are obtained which can be set up in an offset machine and used for printing.

If transparent supporting material is used, the electrophotographic images can also be used as masters for the production of additional copies on any type of light-sensitive sheets. In this respect, the photoconductive compounds provided by the invention are superior to the substances used hitherto, such as selenium or zinc oxide, inasmuch as the latter give only cloudy layers.

If translucent supports are used for photoconductive layers such as are provided by the invention, reflex images can be produced also. The electrophotographic material constituted in accordance with the invention has the advantage that it gives images rich in contrast and that it can be charged positively as well as negatively.

The invention will be further illustrated by reference to the following specific examples:

*Example I*

1 part by weight of the compound corresponding to Formula 1 (prepared by the Von Braun and Bayer method, "Annalen der Chemie," 472 (1929), p. 116) and 1 part by weight of a phenol-modified synthetic resin ("Rhenophen" 140) are dissolved in 50 parts by weight of benzene and applied to an opaque (light-diffusing) paper the surface of which has been treated against the penetration of organic solvents, and the coating is dried.

After being charged by a negative corona discharge, the paper is placed coated side upon a double-sided printed page and exposed for four seconds to the light of a 100 watt incandescent lamp. The light passes through the opaque paper from the uncoated side; a sheet of black paper is first placed behind the double-sided printed page. After exposure, the reflex image is developed with a mixture of carrier and toner in which the carrier may be tiny glass balls, iron powder, and organic or inorganic substances. The toner may consist of a resin-carbon black mixture or a pigmented resin of a grain size of 1–100µ. Positive mirror images are obtained by this developing procedure and they can be transferred to any type of paper or foil by pressure and thus converted into a correct image. A correct image may also be prepared in known manner using an electric field, and transparent papers or foils can be used as intermediate originals for further duplicating, e.g., on diazo paper.

*Example II*

0.5 part by weight of the compound corresponding to Formula 4 (prepared by the Luttringhaus and Neresheimer method, "Justus Liebig's Annalen der Chemie," 473 (1929), p. 285) and 0.5 part by weight of the compound corresponding to Formula 3 (prepared by the Goldschmied method, "Monatshefte der Chemie" (1881), No. 2, p. 582), 1 part by weight of ketone resin (Kunstharz EM) and 0.01 part by weight of Victoria Blue B (Schultz' "Farbstofftabellen," 7th edition, (1931), p. 822) are dissolved in 30 parts by weight of ethyleneglycol monomethylether, applied to a sheet of paper, and dried. After being charged by a corona discharge, the paper is exposed under a master to the light of a 100 watt incandescent lamp for 0.5 second at a distance of about 15 cm. and then dusted over with the developer described in Example I. An image corresponding to the master is produced, which is fixed by heating.

*Example III*

1.5 parts by weight of aminochrysene (Abbeg, "Berichte der Deutschen Chemischen Gesellschaft," 23, (1890), p. 793), 1 part by weight of ketone resin (Kunstharz EM) and 0.02 part by weight of Erythrosin (Schultz' "Farbstofftabellen," 7th edition (1931), No. 886) are dissolved in 30 parts by weight of ethyleneglycol monomethylether. The solution is applied to a paper and dried. After being charged by means of a corona discharge, the paper is exposed under a master to the light of a 100 watt incandescent lamp for 1 second at a distance of about 15 cm. and then dusted over with the developer described in Example I. If a polarity of the electrical charge is used which is opposite to the polarity of the toner contained in the developer, an image corresponding to the master is obtained which is fixed by heating. By changing the polarity of the corona discharge, it is also possible to obtain reversal images by using the same master and the same developer.

*Example IV*

0.5 part by weight of 2.3-diamino-phenazine (Fischer and Hepp, "Berichte der Deutschen Chemischen Gesellschaft," 23 (1890), p. 2788), 0.5 part by weight of the compound corresponding to Formula 2 (Von Braun and Bayer, "Annalen der Chemie," 472 (1929), p. 113), 0.03 part by weight of Methylene Blue (Schultz' "Farbstofftabellen," 7th edition, (1931) No. 1038) and 1 part by weight of resin-modified maleic acid resin ("Beckacite" K 105) are dissolved in a mixture of 20 parts by weight of methylene chloride and 20 parts by weight of benzene. The solution is applied to a paper foil the surface of which has been treated against the penetration of organic solvents. The coating is dried; further procedure is as in Example I. An image corresponding to the master is obtained.

*Example V*

A solution consisting of 0.5 part by weight of 3-aminocarbazole, 0.5 part by weight of the compound corresponding to Formula 4, and 0.01 part by weight of Fast Acid Eosin G (Schultz' "Farbstofftabellen," 7th edition (1931), No. 870), in 30 parts by weight of ethyleneglycol monomethylether is used to coat a paper the surface of which was previously treated in known manner to prevent the penetration of organic solvents, and the paper is then dried. Direct images can be provided on this paper by the electrophotographic process, i.e., after being charged by a corona discharge, the paper is exposed under a master to the light of a high-pressure mercury vapor lamp and then dusted over in known manner with a developer consisting of a mixture of carrier and toner. The carrier and toner may be the same as that described in Example I above. Images rich in contrast are obtained, and images can also be produced by episcopic projection from double-sided printed pages; half tones and full tones are reproduced well.

*Example VI*

1 part by weight of aminochrysene and 1 part by weight of ketone resin (Kunstharz AW2) are dissolved in 50 parts by weight of benzene and the solution is applied to a paper foil as used in Example IV. The coating is dried; further procedure is as in Example IV, images corresponding to the master being obtained.

*Example VII*

10 parts by weight of chlorinated polyvinyl chloride ("Rhenoflex") are dissolved in 100 parts by weight of methylethylketone. 10 parts by weight of the compound corresponding to Formula 4, dissolved in 50 parts by weight of toluene, are added to this solution, followed by 0.011 part by weight of Rhodamine B extra (Schultz' "Farbstofftabellen," 7th edition, 1st vol. (1931), No. 864) dissolved in 2 parts by weight of methanol. The solution thus obtained is coated mechanically upon paper by means of a casting device. On this paper, direct images are produced by the electrophotographic process as described in Example IV. Images rich in contrast can be produced by episcopic projection from double-sided masters.

In the same manner as described above it is possible to obtain good images by using instead of the compound of Formula 4 the same amount of 5-aminoacenaphthene corresponding to Formula 5 (Sachs and Mosebach, "Berichte der Deutschen Chemischen Gesellschaft," 44 (1921), Seite 2855).

It will be obvious to those skilled in the art that many modifications may be made within the scope of the present invention without departing from the spirit thereof, and the invention includes all such modifications.

What is claimed is:

1. A photographic reproduction process which comprises exposing an electrostatically charged supported photoconductive insulating layer to light under a master and developing the resulting image with an electroscopic material, the photoconductive layer comprising a compound having the formula

R—NH$_2$ in which R is selected from the group consisting of a hydrocarbon carbocyclic fused ring group having at least three fused rings, at least two of which are fused benzene rings, and a carbocyclic fused ring group having at least three fused rings, one of which has an oxo substituent.

2. A process according to claim 1 in which the photoconductive layer contains a dyestuff sensitizer.

3. A process according to claim 1 in which the photoconductive layer contains a resin.

4. A process according to claim 1 in which the compound is 2-amino-anthracene.

5. A process according to claim 1 in which the compound is 1-amino-anthracene.

6. A process according to claim 1 in which the compound is 1-amino-pyrene.

7. A process according to claim 1 in which the compound is 13-amino-benzanthrone.

8. A process according to claim 1 in which the compound is amino-chrysene.

9. A process according to claim 1 in which the compound is 5-amino-acenaphthene.

References Cited by the Examiner
UNITED STATES PATENTS

| | | | |
|---|---|---|---|
| 2,297,691 | 10/1942 | Carlson | 96—1 |
| 2,663,636 | 12/1953 | Middleton | 96—1 |
| 2,980,535 | 4/1961 | Schroeter | 96—115 |
| 3,000,735 | 9/1961 | Gunning et al. | 96—1 |
| 3,041,165 | 6/1962 | Sus et al. | 96—1 |
| 3,097,095 | 7/1963 | Klupfel et al. | 96—1 |

FOREIGN PATENTS

| | | |
|---|---|---|
| 201,301 | 3/1956 | Australia. |
| 562,336 | 5/1958 | Belgium. |
| 1,102,556 | 3/1961 | Germany. |

OTHER REFERENCES

Inokuchi, Bull. Chem. Soc. Japan, 27, pp. 22–27 (1954).

Cherkasov, C.A., 51, 870g (1957).

Vartanian, Acta Physicochim., U.S.S.R., 22, 201–24 (1947).

Das Papier, April 1954, pp. 109–120.

Patterson et al., The Ring Index, Reinhold (1940), page 362.

Bube, Photoconductivity of Solids, Wiley & Sons (1960), Preface XIII.

NORMAN G. TORCHIN, *Primary Examiner.*

P. E. MANGAN, H. N. BURSTEIN, *Examiners.*